UNITED STATES PATENT OFFICE.

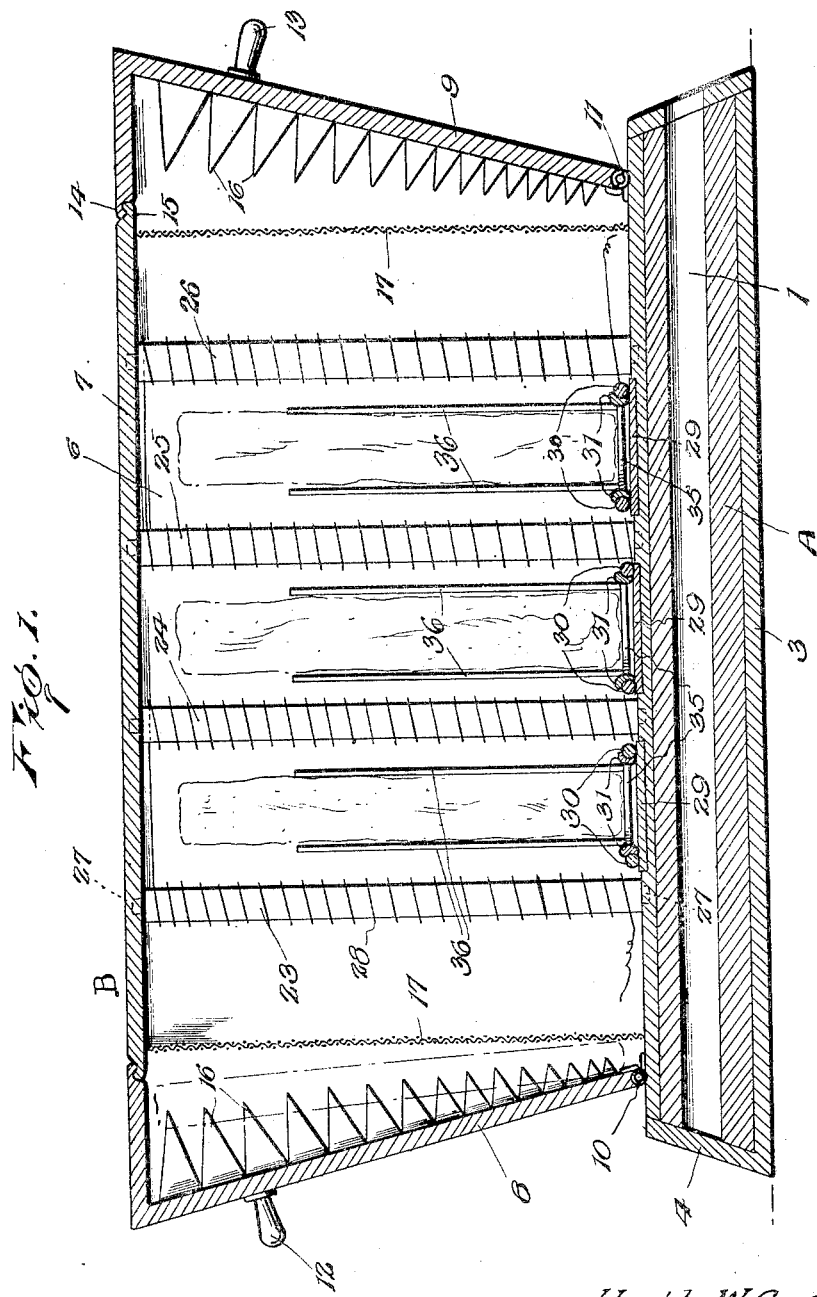

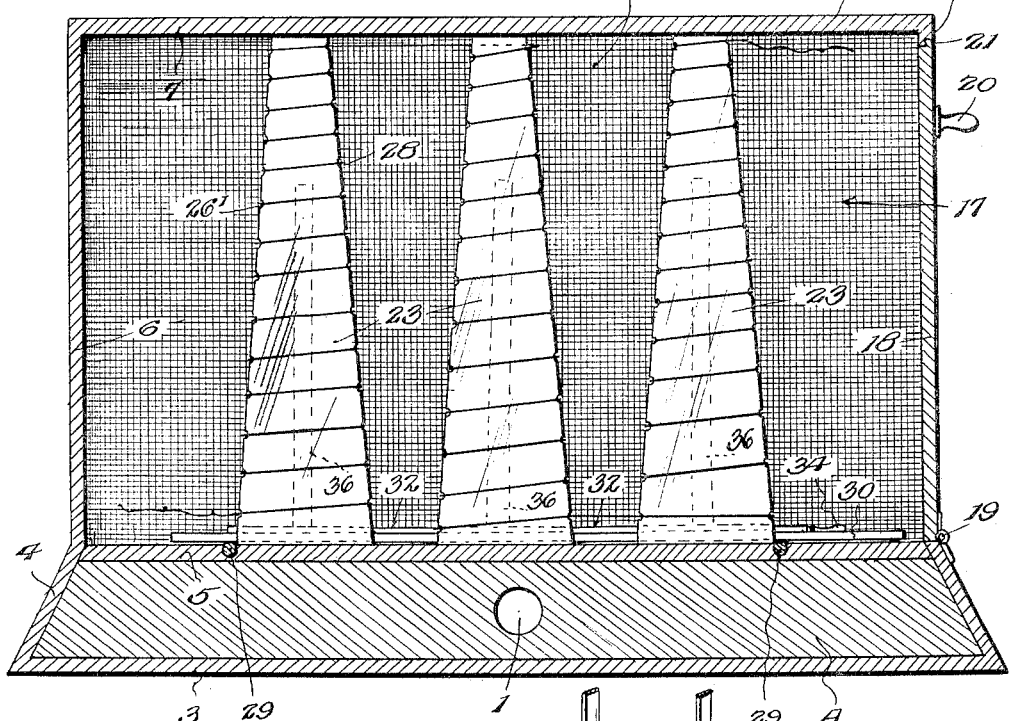

HUGH W. GASAWAY, OF EAST PLEASANT PLAIN, IOWA.

ELECTRIC STOVE.

1,363,108.  Specification of Letters Patent.  Patented Dec. 21, 1920.

Application filed June 15, 1920. Serial No. 389,147.

*To all whom it may concern:*

Be it known that I, HUGH W. GASAWAY, a citizen of the United States, residing at East Pleasant Plain, in the county of Jefferson and State of Iowa, have invented certain new and useful Improvements in Electric Stoves, of which the following is a specification.

This invention relates to an electric stove especially adapted for toasting bread and the like, but which may also be used for other purposes.

In the usual electric toaster it is impossible to accommodate, at the same time, more than two slices of bread one on each side of the heating element. It is also impossible to toast the said slices on more than one side at the same time.

In the present invention, the construction is such that several slices of bread may be simultaneously toasted on both sides with the result that toast may be produced much more quickly than is otherwise the case.

Another feature of this invention resides in the arrangement of spaced heating elements between which slices of bread are inserted for toasting.

The invention has, as a still further feature, the provision of means carrying the individual slices and which may be inserted between the heating elements so as to hold such slices in spaced relation with respect to the heating elements.

A further object of the invention resides in completely inclosing the heating elements of the stove, as contradistinguished from the usual electric toaster construction, for the purpose of conserving the heat to the greatest possible degree.

In the drawings:

Figure 1 is a side elevation, in vertical section, of a toaster constructed in accordance with the present invention;

Fig. 2 is a vertical section, in end elevation;

Fig. 3 is a perspective view of one of the toast racks.

In detail:

The invention, as herein shown, consists of a base A and an upper structure B, the base A being of porcelain or other insulating material and having a passage 1 therethrough and also carrying the finishing members 3, 4 and 5 which likewise may be of porcelain but may be glazed.

Mounted upon the finishing members of the base A and secured thereto by fusion or in any other suitable manner are the side and top members 6 and 7 respectively. The ends of the compartment thus formed by the side and top members 6 and 7 are closed by doors 8 and 9 hinged at 10 and 11 and having knobs 12 and 13. These doors are latched in place by hooks 14 engaging with beads 15 formed on the top member 7. The doors 8 and 9 carry members 16 against which bread or other material to be toasted may rest, and the sides of the compartment adjacent said doors are spaced from the heating elements by the reticulated partitions 17.

The remaining open side of the compartment is closed by a door 18 hinged as at 19 to the base and having a knob 20, said door having a joint 21 with the lip 22 of the top member 7 meeting in such manner that the escape of heat from the interior of the compartment is prevented.

Positioned upright between the finishing plate 5 and the top member 7 are the spaced heating element supports 23, 24, 25 and 26 which have tangs 27 entering suitable recesses in the top member 7 and the finishing plate 5 whereby said supports are maintained in a vertical position.

These supports are arranged in groups as clearly indicated in Fig. 2 and are of wedge shape form, the widest portion being at the bottom. The heating element indicated at 28 may be of the continuous wire type and wrapped spirally about the supports and seated in notches 26' as indicated. The wires forming the terminals of this heating element may be led out through the passage 1 for connection with a suitable socket plug. The heating element 28 is indicated only diagrammatically in the figures and it is obvious that any suitable type may be employed.

Embedded in the base between each pair of heating elements is a member 29 each of which carries the spaced rails 30 on which the grooved side pieces 31 of a rack 32 are adapted to slide, said rack having the cross piece 33 connecting the grooved side pieces 31 and provided with a handle 34. Cross pieces 35 stiffen the separated grooved side pieces and are formed into uprights 36 between which the slice of bread is placed for toasting.

It will be seen from the foregoing description that the heating elements are entirely inclosed and thus the bread placed within the compartment is quickly toasted due to the fact that none of the heat is dissipated.

In using the toaster the bread is first placed in the racks 32 and such racks inserted between the heating elements as shown in Fig. 1. Slices of bread may also be placed on the members 16 of the doors 8 and 9 but these will only be toasted on one side. However, it will be apparent that the bread placed in the racks 32 will be simultaneously toasted on both sides.

The top face of the stove or toaster being flat, it will be observed that cooking vessels may be placed thereon and inasmuch as the full heat is directed against this upper face the same may be used for efficiently cooking things or for keeping plates or toast warm.

I claim:

1. The combination in an electric stove of a plurality of vertically extending heating elements disposed in parallel relation, parallel track members between each pair of heating elements, and racks having vertically disposed arms for supporting food and provided with horizontally disposed guides coöperating with said tracks whereby the racks may be moved in and out with respect to the heating elements.

2. The combination in an electric stove of a plurality of vertically extending heating elements disposed in parallel relation, parallel track members between each pair of heating elements, racks having vertically disposed arms for supporting food and provided with horizontally disposed guides coöperating with said tracks whereby the racks mays be moved in and out with respect to the heating elements, and an inclosure for all of said heating elements and supporting the same at the top.

3. The combination in an electric stove, of a plurality of vertically arranged spaced heating elements; track members between such elements, and food supporting racks guided by said track members.

4. The combination in an electric stove, of a plurality of vertically arranged spaced heating elements, track members between such elements, and food suporting racks having grooved sides for engagement with said tracks.

5. The combination in an electric stove, of an inclosure mounting a plurality of vertically arranged spaced heating elements, doors for said inclosure, and means for supporting food to be cooked between said heating elements.

6. The combination in an electric stove, of an inclosure mounting a plurality of vertically arranged spaced heating elements, track members between such elements, food supporting members guided by said track members, and doors for said inclosure permitting insertion and removal of said food supporting members.

7. The combination in an electric stove, of an inclosure mounting a plurality of vertically arranged spaced heating elements, track members between such elements, food supporting racks guided thereby, and doors adjacent the end heating elements and adapted to support food.

8. The combination in an electric stove, of an inclosure mounting a plurality of vertically arranged spaced heating elements and having a flat top face adapted to support cooking utensils, and means for supporting material to be cooked between such heating elements.

9. The combination in an electric stove, of an inclosure mounting a plurality of vertically arranged spaced heating elements and having a flat top face adapted to support cooking utensils, tracks between said heating elements; and food supporting racks guided by said track members.

10. The combination in an electric stove, of an inclosure mounting a plurality of vertically arranged spaced heating elements and having a flat top face adapted to support cooking utensils, tracks between said heating elements, and food supporting racks guided by said track members and having vertical prongs for engaging the food to hold the same in spaced relation with respect to the heating elements.

11. The combination in an electric stove, of a plurality of vertically arranged spaced heating elements having greater width at one end than at the other, and means for supporting material to be cooked on both sides between such elements.

12. The combination of an electric stove, of a plurality of vertically arranged spaced heating elements having greater width at one end than at the other, means for supporting material to be cooked on both sides between such elements, and an inclosure for said heating elements having doors arranged to support food adjacent the outside elements.

In testimony whereof I affix my signature.

HUGH W. GASAWAY. [L. S.]